(12) United States Patent
Ko et al.

(10) Patent No.: US 12,277,637 B2
(45) Date of Patent: Apr. 15, 2025

(54) AI AVATAR-BASED INTERACTION SERVICE METHOD AND APPARATUS

(71) Applicant: DMLab. CO., LTD., Seoul (KR)

(72) Inventors: Han Seok Ko, Seoul (KR); Jeong Min Bae, Seoul (KR); Miguel Alba, Seoul (KR)

(73) Assignee: DATUM POINT LABS, INC., Jackson, WY (US)

( * ) Notice: Subject to any disclaimer, the term of this patent is extended or adjusted under 35 U.S.C. 154(b) by 0 days.

(21) Appl. No.: 17/669,666

(22) Filed: Feb. 11, 2022

(65) Prior Publication Data

US 2022/0301251 A1 Sep. 22, 2022

(30) Foreign Application Priority Data

Mar. 17, 2021 (KR) .................. 10-2021-0034756
Jan. 6, 2022 (KR) .................. 10-2022-0002347

(51) Int. Cl.
*G06T 13/40* (2011.01)
*G06N 3/006* (2023.01)
(Continued)

(52) U.S. Cl.
CPC .............. *G06T 13/40* (2013.01); *G06N 3/006* (2013.01); *G06V 40/161* (2022.01);
(Continued)

(58) Field of Classification Search
CPC ....... G06T 13/40; G06T 15/005; G06N 3/006; G06V 40/161; G06V 40/172; G10L 17/22;
(Continued)

(56) References Cited

U.S. PATENT DOCUMENTS 10,206,036 B1 * 2/2019 Feng .................... G06V 40/161
2017/0068551 A1 * 3/2017 Vadodaria ............ G06Q 10/107
(Continued)

OTHER PUBLICATIONS

Nunamaker, Jay F., et al. "Embodied conversational agent-based kiosk for automated interviewing." Journal of Management Information Systems 28.1 (2011): 17-48. (Year: 2011).*
(Continued)

*Primary Examiner* — Daniel F Hajnik
(74) *Attorney, Agent, or Firm* — HAYNES AND BOONE, LLP

(57) ABSTRACT

Artificial intelligence avatar-based interaction service is performed in a system including an unmanned information terminal and an interaction service device. A sound signal is collected from a microphone array mounted in the unmanned information terminal and an image signal collected from a vision sensor to the interaction service device. A sensing area is set based on the received sound signal and image signal by the interaction service device; recognizing an active speaker based on a voice signal of a user and an image signal of the user collected in the sensing area, by the interaction service device. A response for the recognized active speaker is generated to provide a 3D rendering an artificial intelligence avatar to which the response is reflected. The rendered artificial intelligence avatar is provided to the unmanned information terminal by the interaction service device.

20 Claims, 6 Drawing Sheets

(51) Int. Cl.
*G06V 40/16* (2022.01)
*G10L 17/22* (2013.01)
*H04R 1/40* (2006.01)
*H04R 3/00* (2006.01)

(52) U.S. Cl.
CPC ............ *G06V 40/172* (2022.01); *G10L 17/22* (2013.01); *H04R 1/406* (2013.01); *H04R 3/005* (2013.01); *H04R 2201/401* (2013.01)

(58) Field of Classification Search
CPC ......... G10L 17/00; G10L 15/25; H04R 1/406; H04R 3/005; H04R 2201/401; G06F 3/017
See application file for complete search history.

(56) References Cited

U.S. PATENT DOCUMENTS

| | | | |
|---|---|---|---|
| 2018/0124466 A1* | 5/2018 | Park | H04N 23/631 |
| 2019/0246075 A1* | 8/2019 | Khadloya | G06V 40/10 |
| 2020/0410980 A1* | 12/2020 | Yamada | G06F 3/167 |
| 2021/0327449 A1* | 10/2021 | Shin | G10L 21/0216 |

OTHER PUBLICATIONS

Kwon, Dong-Soo, et al. "Emotion interaction system for a service robot." RO-MAN 2007—The 16th IEEE International Symposium on Robot and Human Interactive Communication. IEEE, 2007. (Year: 2007).*

* cited by examiner

AI AVATAR-BASED INTERACTION SERVICE METHOD AND APPARATUS

RELATED APPLICATION

This application claims the priority of Korean Patent Application No. 10-2021-0034756 filed on Mar. 17, 2021 and Korean Patent Application No. 10-2022-0002347 filed on Jan. 6, 2022 in the Korean Intellectual Property Office, the disclosure of which is incorporated herein by reference.

BACKGROUND

Field

The present disclosure relates to an avatar-based interaction service method and an apparatus thereof.

Description of the Related Art

An avatar which means an alter ego or a personification is an animated character which takes a role of a user in a cyberspace.

Most of the existing avatars are two-dimensional pictures. A two-dimensional avatar which appeared in a multiuser dungeon game or an online-chatting was at the basic level so that avatar techniques for compensating for the lack of realism or three-dimensional effect are still emerging. Recently, along with the development of an artificial intelligence technology and a sensor technology, there is an emerging need for artificial intelligence avatar technology which naturally communicates with humans.

SUMMARY

An object of the present disclosure is to provide an artificial intelligence avatar-based interaction service method which naturally communicates with humans and an apparatus therefor.

In order to solve the above-described problems, according to an aspect of the present disclosure, an artificial intelligence avatar-based interaction service technique which is performed in a system including an unmanned information terminal and an interaction service device. The technique includes transmitting a sound signal collected from a microphone array mounted in the unmanned information terminal and an image signal collected from a vision sensor to the interaction service device. A sensing area is set based on the received sound signal and image signal by the interaction service device. An active speaker is recognized based on a voice signal of a user and an image signal of the user collected in the sensing area, and a response is generated by the interaction service device for the recognized active speaker. A 3D rendering of an artificial intelligence avatar to which the response is reflected, and then the rendered artificial intelligence avatar is provided to the unmanned information terminal by the interaction service device.

According to one embodiment, the interaction service device estimates a sound source direction based on the received sound signal by a sound source direction estimating technique, limits an input of a sound from the side by a sidelobe signal cancelling technique. The interaction service device limits image input after an object recognized by applying a background separating technique to the received image signal.

According to another embodiment, in the recognizing of an active speaker, the interaction service device checks the number of people from an image signal of the user in the sensing area by a face recognizing technique and when a plurality of people is recognized in the sensing area. The interaction service device selects a person which is recognized as a speaker as an active speaker using any one or more of a sound source position estimating technique, a voice recognizing technique, and a mouth-shape recognizing technique.

According to another embodiment, in the providing of the artificial intelligence avatar to the unmanned information terminal, non-verbal information including any one or more of a facial expression, a pose, a gesture, and a voice tone of a speaker is analyzed from the received image signal of the user to generate a response.

According to another embodiment, in the providing of the artificial intelligence avatar to the unmanned information terminal, the interaction service device recognizes a voice of the active speaker by any one or more of the voice recognition (ASR), natural language understanding (NLU), and text-to-speech (TTS).

According to another embodiment, the interaction service device applies a weight to the recognized voice information and non-verbal information and applies different weights when the voice information and the non-verbal information show a result in the same direction or otherwise show consistent results and when the voice information and the non-verbal information show results in different directions or otherwise show inconsistent results.

According to another embodiment, in the providing of the artificial intelligence (AI) avatar to the unmanned information terminal, a facial expression, a gesture, and a voice tone are analyzed from the image of the user to recognize an emotional state of the user to change an expression, a gesture, or a voice tone of the AI avatar in response to the recognized emotional state or add an effect.

According to another aspect of the present disclosure, an artificial intelligence avatar-based interaction service apparatus includes an unmanned information terminal which includes a microphone array and a vision sensor and collects a sound signal from the microphone array and an image signal from the vision sensor. An interaction service device, which receives the sound signal and the image signal to set a sensing area, recognizes an active speaker based on the voice signal of the user and the image signal of the user collected in the sensing area. The interaction service device generates a response for the recognized active speaker, and 3D renders the artificial intelligence avatar to which the response is reflected, and then provides the rendered artificial intelligence avatar to the unmanned information terminal.

According to the exemplary embodiment of the present disclosure, an interaction service, which autonomously talks with a user and returns a response based on the artificial intelligence avatar may be provided.

Further, it is possible to provide an interaction service, which is capable of responding by finding a speaker among a plurality of speakers or in a noise, using an artificial intelligence avatar.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
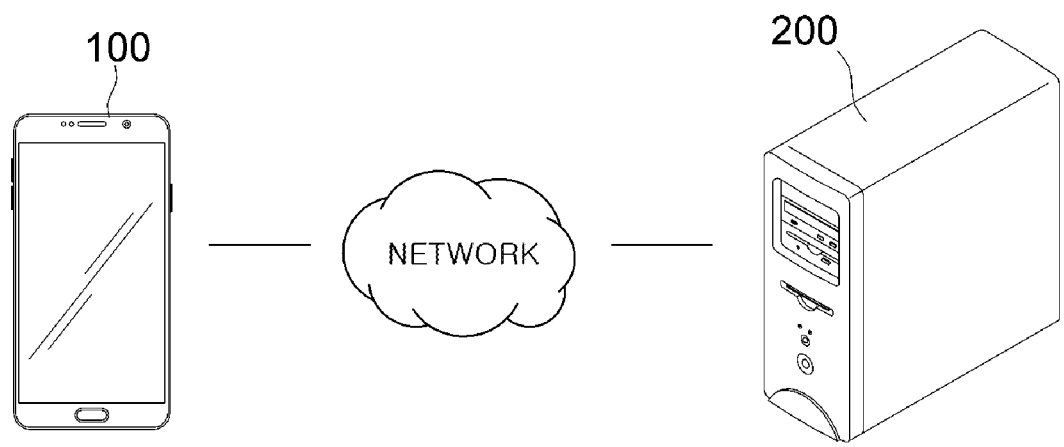
FIG. 1 is a view illustrating a configuration of a network environment according to an exemplary embodiment of the present disclosure.

Those skilled in the art may make various modifications to the present disclosure and the present disclosure may have various embodiments thereof, and thus specific embodiments will be described in detail with reference to the drawings. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes a combination of a plurality of related elements or any one of the plurality of related elements.

In the specification and claims, unless explicitly described to the contrary, the word "comprise" and variations such as "comprises" or "comprising", will be understood to imply the inclusion of stated elements but not the exclusion of any other elements. The exemplary embodiments present non-limiting examples of the disclosed techniques and the operation of the disclosed techniques and are not intended to limit the scope of the invention beyond what is described in the claims.

An interaction service server of an exemplary embodiment of the present disclosure implements a human or an artificial intelligent system to serve as virtual agents which permit another mechanism interacting therebetween.

Hereinafter, the present disclosure will be described with reference to the accompanying drawings.

FIG. 1 is a view illustrating a configuration of a network environment according to an exemplary embodiment of the present disclosure. A network environment of FIG. 1 includes an unmanned information terminal 100 and an interaction service device 200. The unmanned information terminal 100 provides an "untact" interactive environment, meaning an environment without face-to-face encounters. In general, "untact" means without direct human contact, and an untact interactive environment means an environment without human contact.

The unmanned information terminal 100 is a terminal which accesses the interaction service device 200 via a communication network. By way of non-limiting example, users who want to use an interaction service such as a kiosk can use the unmanned information terminal. The unmanned information terminal may be implemented as an electronic device or a similar device thereto which communicates with the interaction service device 200 via a wired or wireless communication network and receives an input of the user and outputs a screen.

Here, the communication network may be implemented using at least some of TCP/IP, a local area network (LAN), WiFi, long term evolution (LTE), wideband code division multiple access (WCDMA), and wired communication, wireless communication which have been known so far or will be known in the future, and other communication techniques. Even though many communications are performed through the communication network, the communication network will not be mentioned in the following description for simplifying the description.

The interaction service device 200 may be implemented by a computer device or a plurality of computer devices which communicates with the unmanned information terminal 100 through the communication network to provide instructions, codes, files, contents, and services. By way of non-limiting example, the interaction service device 200 may provide an interaction service intended by an application, as a computer program which is installed and driven in the unmanned information terminal 100 accessing through the communication network. Here, the interaction service is defined as a service provided between the unmanned information terminal 100 and an avatar created by the interaction service device 200. The field may include customer service, consulting, education, and entertainment.

By way of non-limiting example, in the field of education, the interaction service device 200 learns responses of a service provider who is a teacher in an untact conversation environment, meaning without direct human contact. The untact conversation environment is established by creating an artificial intelligence (AI) avatar and providing an interaction service to students based on the created AI avatar. The study guidance may be performed on a user terminal 100 which is a student in the untact conversation environment through the AI avatar which is trained or previously programmed, without accessing the service provider terminal who is a teacher.

In other words, the interaction service according to the exemplary embodiment of the present disclosure allows the AI avatar which is trained or previously programmed to provide interaction/communication based on real-time response of the human, in the untact conversation environment.

According to the exemplary embodiment of the present disclosure, even though it has been described that the interaction service device 200 is independent from the unmanned information terminal 100, it is not limited thereto so that the interaction service device 200 may be integrally formed with the unmanned information terminal 100 or mounted in the unmanned information terminal 100.

Figure 2:
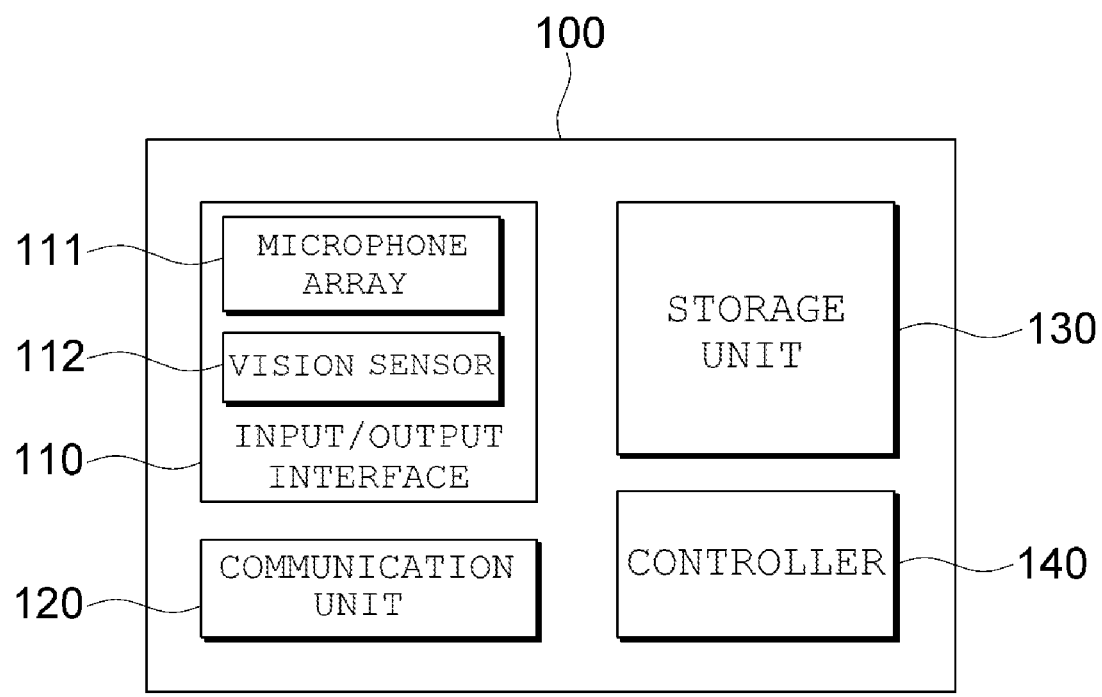
FIG. 2 is a block diagram illustrating a configuration of an unmanned information terminal according to an exemplary embodiment of the present disclosure.

FIG. 2 is a block diagram illustrating a configuration of an unmanned information terminal according to an exemplary embodiment of the present disclosure. Referring to FIG. 2, the unmanned information terminal 100 according to the exemplary embodiment of the present disclosure includes an input/output interface 110, which includes a microphone array 111 and a vision sensor 112. The unmanned information terminal 100 also includes a communication unit 120, a storage unit 130, and a controller 140.

The input/output interface 110 may be a unit for interfacing with an input/output device. The input/output interface 110 includes an input device including microphone array 111 and vision sensor 112 and an output device such as a display or a speaker to collect sensed data, which may be a discrete speaker or integrated with microphone array.

At least three to five microphone arrays 111 may be configured and one microphone is used to recognize a voice and the other microphones are used for another technique of allowing beam formation or directive signal reception. The beam formation is applied to ensure a robust voice recognition performance from a signal mixed with noises. The vision sensor 112 may be a camera which does not include a depth sensor, a stereo camera, or a camera including a depth sensor. When the camera including a depth sensor is used, a limit of a foreground or a background is selected to limit the detection of a human or an object in the background to set an area in which a human accessing the device can be focused.

As another non-limiting example, the input/output interface 110 may be a unit for interfacing with a device in which functions for input and output are integrated into a single unit, such as a touch screen. The input/output device may be configured as one device with the unmanned information terminal 100.

As a more specific example, a storage unit 130 is used to store instructions and data, and a controller 140 are used to store data and provide control functions for the unmanned information terminal 100. When the controller 140 processes an instruction of a computer program loaded in the storage unit 130, image and voice information acquired through the input/output interface 110 is transmitted to the interaction service device 200 and a service screen or contents configured using data provided from the interaction service device 200 may be displayed on a display through the input/output interface 110.

According to another exemplary embodiment, the input/output interface 110 may further include an artificial tactile nerve, an olfactory sensor, an artificial cell membrane electronic tongue, and the like to implement an avatar similar to a human.

The input/output interface 110 as described above serves as a sensing organ of the avatar similar to a human. By way of non-limiting example, vision is implemented by a camera (a vision sensor), hearing is implemented by a microphone or a microphone array, touch is implemented by an artificial tactile nerve, smell is implemented by an intelligent olfactory sensor, and taste is implemented by an artificial cell membrane electronic tongue.

The communication unit 120 exchanges data with the interaction service device 200. The communication unit 120 transmits data received from the interaction service device 200 to the controller 140. Further, the communication unit 120 transmits the data to the interaction service device 200 according to the control of the controller 140. A communication technique used by the communication unit 120 may vary depending on a type of a communication network or other circumstances.

The storage unit 130 stores data and transmits the requested data to the controller 140 according to the control of the controller 140. The controller 140 controls an overall operation and each component of the terminal 100. As it will be described below, the controller 140 transmits a user image or voice input from the input/output interface 110 to the interaction service device 200 through the communication unit 120 and controls to display the artificial intelligence avatar on the input/output device according to information received from the interaction service device 200.

Figure 3:
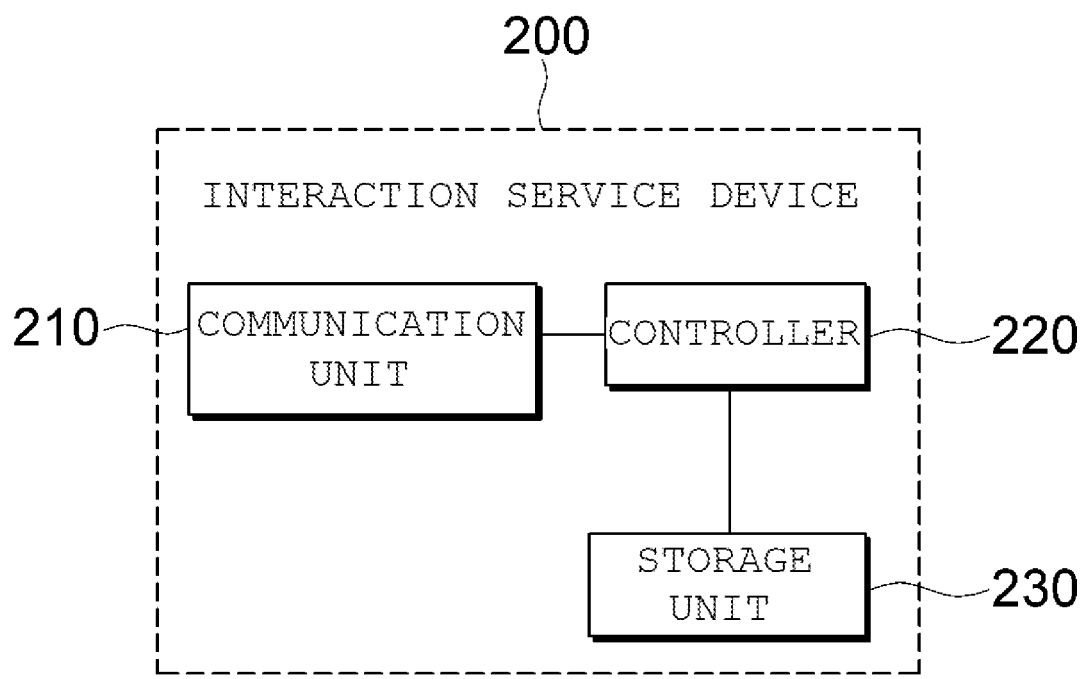
FIG. 3 is a block diagram illustrating a configuration of an interaction service server according to an exemplary embodiment of the present disclosure.

FIG. 3 is a block diagram illustrating a configuration of an interaction service server according to an exemplary embodiment of the present disclosure. Referring to FIG. 3, the interaction service device 200 according to the exemplary embodiment of the present disclosure includes a communication unit 210, a controller 220, and a storage unit 230.

The communication unit 210 is a data transmitting/receiving device equipped in the interaction service device 200 to transmit and receive information for interaction service with the unmanned information terminal through the communication network.

The communication unit 210 exchanges data (information for interaction with the artificial intelligence avatar) with the unmanned information terminal (100 in FIG. 1) and/or other external devices. The communication unit 210 transmits received data to the controller 220. Further, the communication unit 210 transmits the data to the unmanned information terminal 100 according to the control of the controller 220. A communication technique used by the communication unit 210 may vary depending on a type of a communication network or other circumstances.

The communication unit 210 may receive an image obtained by capturing the user through a camera and a voice acquired by a microphone provided in the unmanned information terminal 100. Further, the communication unit 210 may transmit information for outputting the artificial intelligence avatar to the accessed unmanned information terminal 100.

In order to control the overall operation and each component of the interaction service device 200, the controller 220 may be configured to perform basic arithmetic, logic, and input/output operations to process instructions of the computer program. The instructions are provided to the controller 220 through the storage unit 230 or the communication unit 210. By way of non-limiting example, the controller 220 may be a processor which is configured to execute a received instruction according to a program code stored in a storage device such as a storage unit 230.

The controller 220 may provide an interaction service through the avatar to the accessed unmanned information terminal 100 based on the image obtained by capturing the user and the voice which are received through the communication unit 210. Here, the received image and voice are an image and a voice received and acquired by the input/output interface 110 of the unmanned information terminal 100.

According to an exemplary embodiment, the controller 220 sets a sensing area based on the image and the voice received from the unmanned information terminal 100 and recognizes an active speaker based on the image and the voice in the set sensing area. Thereafter, the controller 220 creates an artificial intelligence avatar which interacts with the active speaker. The implementation of the controller 220 will be described below with reference to FIGS. 4 and 7.

According to the exemplary embodiment, the artificial intelligence avatar created for the interaction of the controller 220 exchanges glances to make eye contact and may talk in a colloquial style during the conversation with the user to provide a sense of vitality to the user. Further, the avatar may utilize memories (stored data) obtained from the past conversations with the user to have natural-speech, realistic conversations in the form of everyday conversations, questions, and answers.

Further, the avatar system may recognize emotions to recognize a reaction or an emotional state of the user through facial expression, body motions, and voice tone of the user and express an emotion of the avatar by determining an appropriate response for the recognized emotion and selecting a voice tone and appropriate words for every emotion corresponding to the facial expression.

According to the exemplary embodiment, the controller 220 may transmit data, videos, and audios in real time in a peer-to-peer (P2P) technique by applying web real-time communication (WebRTC) or another mechanism which enables real-time interaction between two or more entities on the network.

The storage unit 230 serves to store a program and data required for an operation of the interaction service device 200 and may be divided into a program area and a data area.

The program area may store a program which controls an overall operation of the interaction service device 200 and an operating system (OS) which boots the interaction service device 200, at least one program code, a learning model for training the avatar, an application program required to provide an interaction service, and the like. By way of non-limiting example, the program may provide code for a browser installed and driven in the unmanned information terminal 100, an application installed in the unmanned information terminal 100 to provide a specific service, or a similar application.

Figure 4:
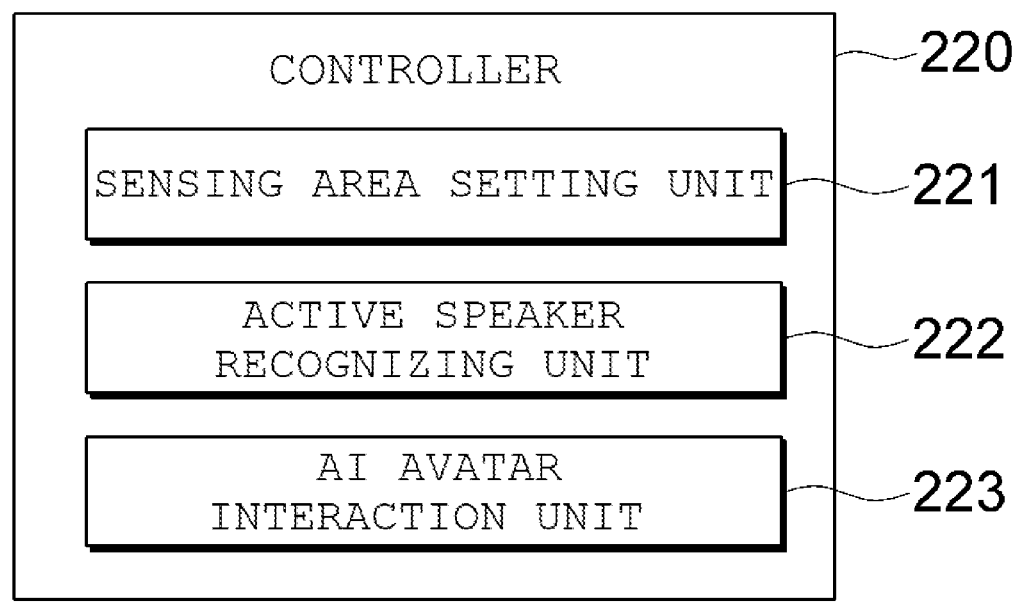
FIG. 4 is a block diagram illustrating an example of a component which may be included by a controller of an interaction service apparatus according to an exemplary embodiment of the present disclosure.
Figure 5:
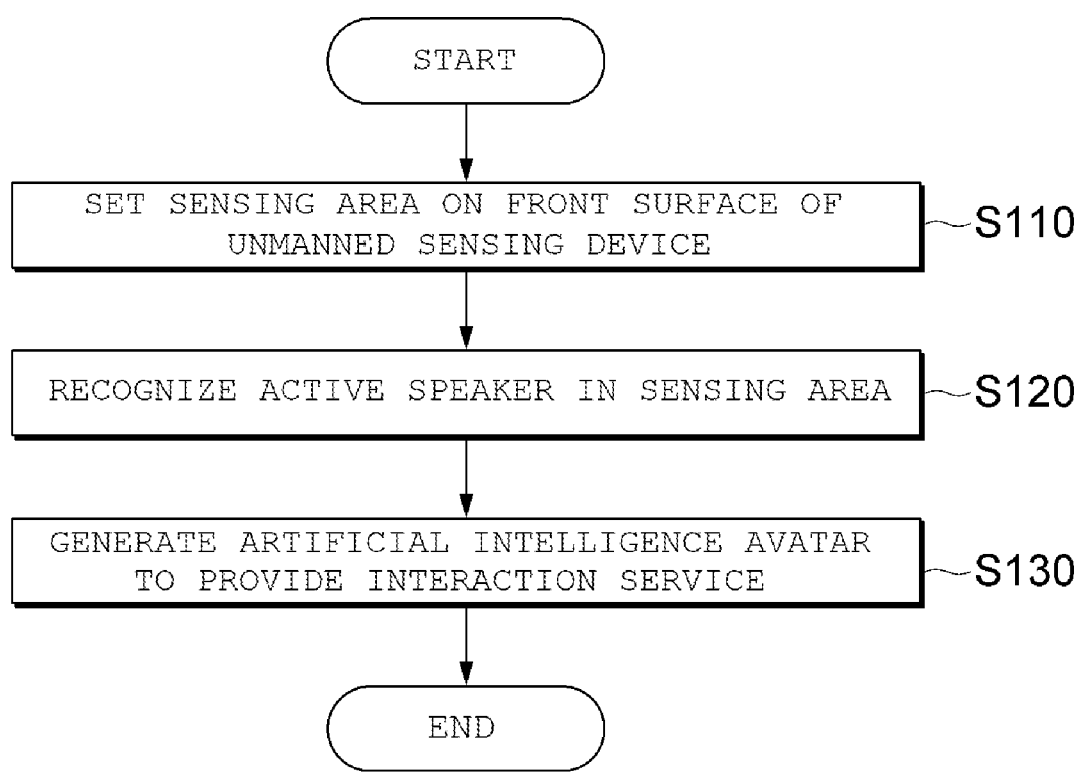
FIG. 5 is a flowchart illustrating an example of a method performed by a controller of an interaction service apparatus according to an exemplary embodiment of the present disclosure.
Figure 6:
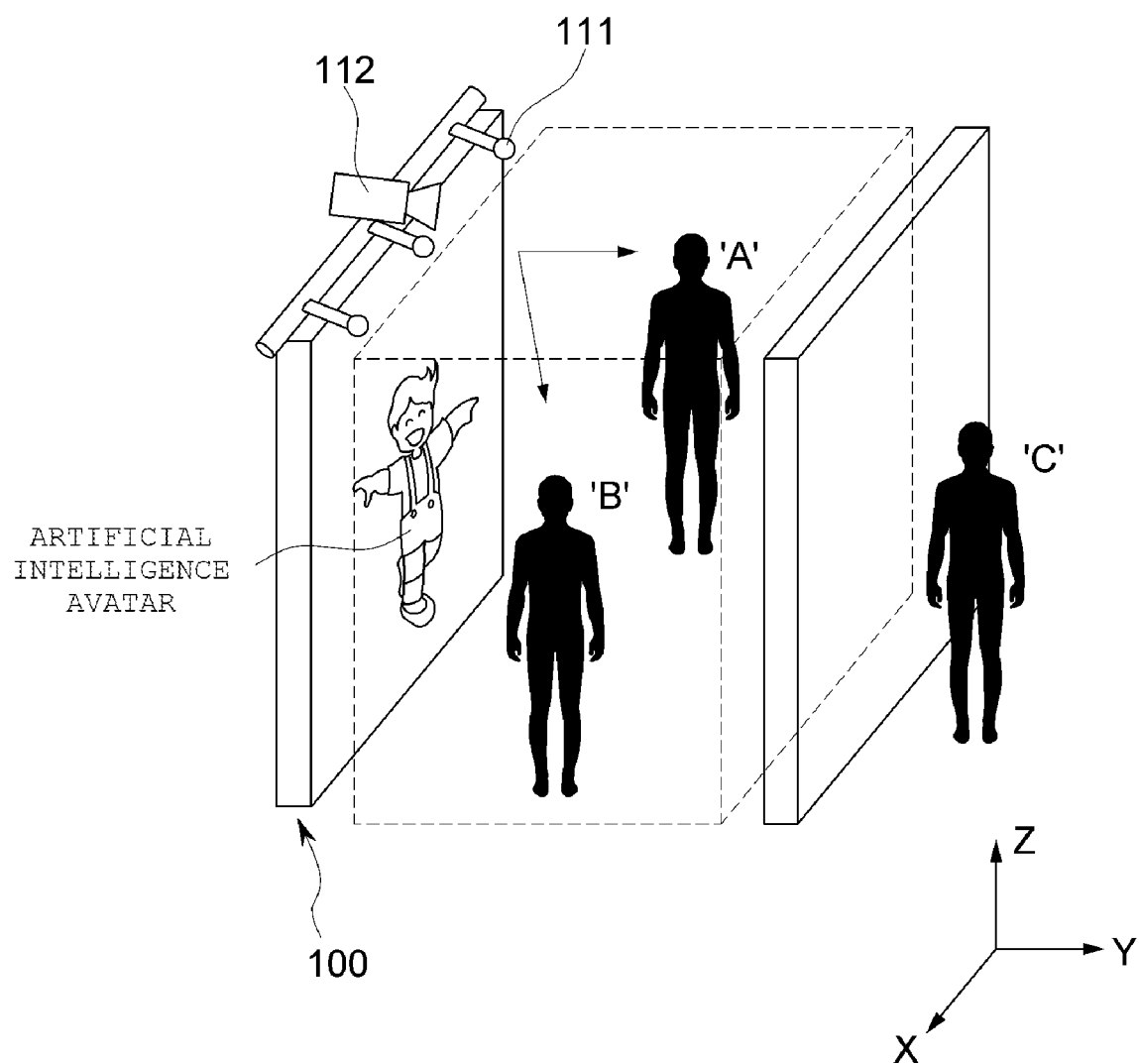
FIG. 6 is a diagram for explaining a sensing area setting according to an exemplary embodiment of the present disclosure.

FIG. 4 is a block diagram illustrating an example of a component which may be included by a controller of an interaction service apparatus according to an exemplary embodiment of the present disclosure. FIG. 5 is a flowchart illustrating an example of a method performed by a controller of an interaction service apparatus according to an exemplary embodiment of the present disclosure. FIG. 6 is a diagram for explaining a sensing area setting according to an exemplary embodiment of the present disclosure.

In order to perform an avatar interaction service method of FIG. 5, the controller 220 of the interaction service device 200, as illustrated in FIG. 4, may include a sensing area setting unit 221, an active speaker recognizing unit 222, and an AI avatar interaction unit 223. According to the exemplary embodiment, the components of the controller 220 may be selectively included in the controller 220 or excluded from the controller 220. Further, according to an exemplary embodiment, the components of the controller 220 may be divided or combined to express the function of the controller 220.

The controller 220 and the components of the controller 220 may control the interaction service device 200 to perform steps S110 to S140 included in the avatar interaction service method of FIG. 5. By way of non-limiting example, the controller 220 and the components of the controller 220 may be implemented to execute instructions according to a code of the operating system included in the storage unit 230 and a code of at least one program.

Here, the components of the controller 220 may be expressions of different functions of the controller 220 which are performed by the controller 220 according to the instructions provided by the program code stored in the interaction service device 200. By way of non-limiting example, as a functional expression of the controller 220 which controls the interaction service device 200 according to the above-described instructions to allow the interaction service device 200 to provide a real-time interaction service, the AI avatar interaction unit 223 may be used.

In step S110, the sensing area setting unit 221 sets a sensing area to limit a sensing area of the artificial intelligence avatar system. Since the human has a selective attention function for things necessary for himself/herself, it is possible to grasp information for determination by focusing only on some signals. Accordingly, by causing the artificial intelligence avatar to focus on a limited environment of the sensing area, it is possible to lead the best performance or the best choice in the current environment. In step S120, the artificial intelligence avatar system recognizes the speaker in the sensing area. In step S130, the artificial intelligence avatar system generates an artificial intelligence avatar, which is used to provide interaction service.

Generally, a microphone acquires sounds in all directions from side and front so that referring to FIGS. 4 to 6, the sensing area setting unit 221 estimates a speaker's position by a sound source localization method and limits an input from the side by a sidelobe signal cancelling method to limit the area in the x-direction. Here, the x-direction indicates a width direction of a screen of the unmanned information terminal 100, a z-direction indicates a length direction of the screen of the unmanned information terminal 100, and a y-direction indicates a distance direction between the unmanned information terminal 100 and a speaker.

The sensing area setting unit 221 includes a background detector to limit an area in the y-direction to exclude information beyond a predetermined distance from the camera.

The sensing area setting unit 221 applies a background removal tool and a background noise suppressor on an image other than the sensing area to remove a background noise. Further, the sensing area setting unit 221 includes a background detector to exclude information of an image other than the sensing area beyond a specific distance from the camera so that an erroneous detection probability is reduced and an image processing speed is improved by removing the background.

As described above, the sensing area setting unit 221 senses an event only in a sensing area limited in a predetermined area in limited x- and y-directions and a predetermined z-direction to reduce the erroneous detection probability and improve a processing speed.

The sensing area setting unit 221 may undergo a process of time-synchronizing information (for example, images and sounds) acquired from a plurality of sensors, before setting the sensing area. The time-synchronizing method can be implemented by a known technique so that a detailed description thereof will be omitted.

In step S120 (FIG. 5), the active speaker recognizing unit 222 includes a face recognizer to recognize a speaker. Where there is a plurality of people in the set sensing area, the active speaker recognizing unit 222 uses a multi-object detector, a mouth-shape recognizing method, and a 3D pose sequence estimator to recognize an active speaker by recognizing a current pose and a gesture. The active speaker refers to a principal agent of the interaction. Here, the mouth-shape recognizing method may utilize lip reading which is utilized in a voice recognition field.

According to the exemplary embodiment, the active speaker recognizing unit 222 recognizes sentence information from audio data acquired from the microphone array 111 of the unmanned information terminal 100. The active speaker recognizing unit generates a sentence by processing contents for input conversation of the user, rather than based on a specific "wake word" or a "timer".

According to the exemplary embodiment, the active speaker recognizing unit 222 generates a voice recognition result by separating whether the input sentence is an instruction to the avatar or a word to another subject rather than the artificial intelligence avatar, through an ASR module which introduces a speaker separating technique.

As illustrated in FIG. 6, it is assumed that speakers A and B are located in the sensing area and a speaker C is located outside the sensing area. The speaker C is located outside the sensing area so that the voice of the speaker C is ignored and voices AAA, AAA1, and AAA2 spoken by the speaker A and voices BBB, BBB1, and BBB2 spoken by the speaker B are distinguished to be recognized. A speaker who is speaking may be recognized by distinguishing a voice of the speaker A or a voice of the speaker B by a voice analyzing method. As another example, after detecting a sound source direction of a sound acquired by the microphone array using a speaker diarization technique, a speaker who is speaking may be recognized by recognizing a face of a person located in the sound source direction and/or recognizing a mouth shape. A speaker diarization is a process of partitioning an input audio stream into homogeneous segments according to the speaker identity. Diarization can enhance the readability of an automatic speech transcription by structuring the audio stream into speaker turns and, when used together with speaker recognition systems.

Further, a keyword detector is included to separate whether the conversation contents are small talk or a request to provide information (for example, news, e-mail, or the like) by a keyword classification technique for a main function.

The active speaker recognizing unit 222 described above may distinguish an active speaker by the speaker diarization technique and a keyword classification technique.

In step S130 (FIG. 5), the AI avatar interaction unit 223 creates an artificial intelligence avatar using a trained model and provides an interaction service through the artificial intelligence avatar to the unmanned information terminal 100 through the communication unit. To this end, the AI avatar interaction unit 223 recognizes, understands, and responds to a voice of the user received from the unmanned information terminal 100 through any one or more of voice recognition (ASR), speech-to-text (STT), natural language understanding (NLU), and text-to-speech (TTS).

The AI avatar interaction unit 223 checks whether there is a selected keyword in the sentence generated by the voice recognition. When there is no selected keyword, the response is generated by a function of an open domain chatbot (computerized conversational agent or robot). At this time, a log of the conversation is recorded and the context for the conversation is grasped based on the log to maintain a consistency of the conversation topic. When there is a selected keyword, a response is generated by a function of a closed domain chatbot. Information about the user request is provided by configuring information about the selected keyword as a preset.

According to the exemplary embodiment, the AI avatar interaction unit 223 renders a 3D character to provide the generated response. The AI avatar interaction unit 223 generates a voice and a body motion to render the 3D character. The AI avatar interaction unit 223 may generate a voice of the 3D character from the sentence included in the generated response using a text-to-speech (TTS) method. At this time, the AI avatar interaction unit 223 may generate various voices with a single deep learning model to optimize a performance for a task of preparing refining and tuning procedures for the number of voice requests.

According to another exemplary embodiment, the AI avatar interaction unit 223 may generate a voice by mimicking a voice pattern of a specific person with respect to a voice of the specific person for a small amount of time. "Small amount of time" describes an amount of time consistent with the required time for machine learning of the specific person's voice without inhibiting the functionality of the AI avatar interaction unit 223, and represents a balance between an initial time required for machine learning to recognize the voice of the specific person, and the ability of the specific person to easily interact with the AI avatar interaction unit 223 without undue difficulty. By way of non-limiting example, the small amount of time could be 40 minutes to one hour. Longer amounts of time can be implemented, provided that the longer amounts of time do not effectively render the AI avatar interaction unit 223 non-functional. Conversely, shorter amounts of time can be implemented if a lesser degree of specificity in recognizing the voice of a specific person is required. The ability of the AI avatar interaction unit 223 to adapt to the voice of a specific person may also be enhanced by learning the voice pattern of the specific person on an ongoing basis.

According to another exemplary embodiment, the AI avatar interaction unit 223 may generate a voice by tuning on an existing training result by adjusting a pitch or a tone using a voice synthesizing unit.

The AI avatar interaction unit 223 may output a gesture which is trained in response to the input sentence by applying a sentence generating function included in the generated response.

The AI avatar interaction unit 223 may generate and output a response result of a new animation from a database of the related art using an open domain chatbot function and a TTS method with respect to user's voice recognition and gesture input.

The AI avatar interaction unit 223 may select an animation matching an answer of the closed domain chatbot after manufacturing an animation group corresponding to the closed domain chatbot.

According to an exemplary embodiment, the AI avatar interaction unit 223 recognizes a speaker and analyzes a facial expression, a pose, a gesture, and a voice tone of the speaker from the image of the user received from the unmanned information terminal 100 to recognize an emotional state of the user to change an expression, a gesture, and a voice tone of the avatar or add an effect in response to the recognized emotional state.

According to the exemplary embodiment, the AI avatar interaction unit 223 may add a weight to a voice recognition result through the voice of the user and a non-voice recognition result through non-verbal information (facial expression, a gesture, or a voice tone) other than the voice of the user.

At this time, the weight to be added may be different according to the voice recognition result and the non-verbal information recognition result. In the case when the voice recognition result and the non-verbal information recognition result other than the voice are in the same direction or logical sequence, or are otherwise consistent with each other, the weights of the voice recognition result and non-verbal recognition results will be increased. On the other hand, in the case when the voice recognition result and the non-verbal information recognition result other than the voice are in different directions or logical sequences, or are otherwise inconsistent with each other, the weights of the voice recognition result and non-verbal recognition results will be decreased. By way of non-limiting example, when the voice recognition result is "positive" and the non-verbal information recognition result is "positive" and when the voice recognition result is "negative" and the non-verbal information recognition result is "negative", as the weights, 1:α may be assigned. In contrast, when the voice recognition result is "positive" and the non-verbal information recognition result is "negative", as the weights, 1:β may be assigned.

In the meantime, the AI avatar interaction unit 223 may provide an interaction service through the AI avatar based on the contents of a database. By way of non-limiting example, the AI avatar interaction unit 223 interworks with the artificial intelligence (AI) conversation system to communicate with the user or provide various information such as weather, news, music, maps, and photos. An artificial intelligence conversation system is applied to a personal assistant system, a chatbot platform, an artificial intelligence (AI) speaker, and the like to understand the intention of a user's instruction and provide information corresponding thereto.

By way of non-limiting example, when the AI avatar interaction unit 223 receives "dance" which is a voice input spoken by the user from a second user terminal, the AI avatar interaction unit 223 recognizes and analyzes the received voice input to acquire information about "dance" and output the acquired information through the AI avatar. At this time, the AI avatar interaction unit 223 may also provide visual information using a separate pop-up window, word bubble, tooltip, or the like, during the information providing process.

The AI avatar interaction unit 223 may exchange the emotion with the user and express the emotion by changing the facial expression of the AI avatar. The AI avatar interaction unit 223 may change the facial expression of the character by changing a face area of the AI avatar which is objectified through 3D modeling and add various effects to the AI avatar to maximize the expression of the emotion. The effect is a content configured by an image object and may collectively include a filter, a sticker, or an emoticon which is capable of being synthesized with the AI avatar-based image and may be implemented by a moving image object to which a flash or an animation is applied, as well as a fixed object. Such an effect represents emotion information and may be classified in advance depending on the emotion. In other words, a plurality of emotions (for example, joy, sadness, surprise, worry, anguish, anxiety, fear, disgust, anger, and the like) is defined in advance and effects representing the corresponding emotion are grouped for every emotion to be managed.

The AI avatar interaction unit 223 may extract emotion information from a sentence of voice input received from the user to express the emotion. At this time, the emotion information may include a type of emotion and an emotional intensity (a degree of emotion). A term which represents the emotion, that is, an emotional term is determined in advance and according to a predetermined criterion, is classified into a plurality of emotion types (for example, joy, sadness, surprise, worry, anguish, anxiety, fear, disgust, anger, and the like) and a plurality of intensity levels (for example 1 to 10) may be classified depending on the strength of the emotional term. The emotional term may include not only a specific word expressing the emission, but also a phrase or sentence including the specific word. For example, a word such as "like" or "painful" or a phrase or sentence such as "I like it so much" may be included in a category of the emotional terms. By way of non-limiting example, the AI avatar interaction unit 223 extracts a morpheme from a sentence according to the voice input of the user, and then extracts a predetermined emotional term from the extracted morpheme to classify an emotion type and an emotional intensity corresponding to the extracted emotional term. When the sentence of the voice input includes a plurality of emotional terms, a weight may be calculated according to the emotion type and the emotional intensity of the emotional term and by doing this, an emotion vector for the emotion information of the sentence is calculated to extract emotion information which representatives the sentence. The technique of extracting the emotion information is illustrative so that it is not limited thereto and already known techniques may also be used.

Even though according to the exemplary embodiment of the present disclosure, it has been described that one user interacts with the AI avatar through the AI avatar interaction unit 223, this is merely an example so that a plurality of people may access the same AI avatar through individual user terminals to interact with the AI avatar.

Figure 7:
FIG. 7 is a view for explaining an implementation embodiment in a customer service field of an avatar-based interaction service method according to an exemplary embodiment of the present disclosure.

FIG. 7 is a view for explaining an implementation embodiment in a customer service field of an avatar-based interaction service method according to an exemplary embodiment of the present disclosure. Referring to FIG. 7, an example which is utilized for ordering a menu in a customer service field, specifically, in a café will be explained.

An interface which talks and responds like a person through an AI avatar provided through the interaction service device 200 may be provided. By way of non-limiting example, the AI avatar which is provided by the interaction service device 200 provides or recommends a menu to a customer who is a user, in a café and explains and performs a payment process. By doing this, the customer (user) may place orders in a more comfortable and intimate way than with a touch screen kiosk.

Figure 8:
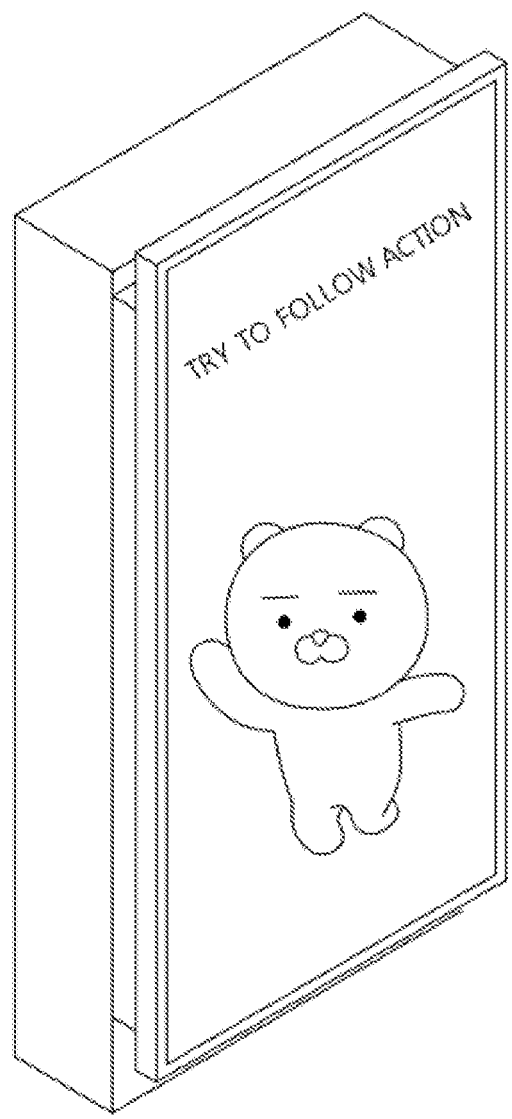
FIG. 8 is a view for explaining an implementation embodiment in a rehabilitation treatment field of an avatar-based interaction service method according to an exemplary embodiment of the present disclosure.

FIG. 8 is a view for explaining an implementation embodiment in a rehabilitation treatment field of an avatar-based interaction service method according to an exemplary embodiment of the present disclosure. Referring to FIG. 8, an example utilized in a rehabilitation treatment field will be explained.

The avatar provided through the interaction service device 200 shows a motion for rehabilitation to a user and analyzes an imitated motion of the user to provide real-time feedback on a pose in a conversational format. As described above, the AI avatar gives a feedback in a conversational format in real-time while observing a pose of the user so that the lesson may be performed at a level of receiving a service from a real person. This provides the advantages of conventional instructions along with a simulation of demonstrative instructions from a person.

In addition to the rehabilitation treatment, it is applicable to all exercises such as Yoga, Pilates, physical therapy (PT).

Further, the interaction service may also be applied to the entertainment field. An avatar having a shape of a specific singer is generated by 3D modeling and the generated avatar imitates a dance of the specific singer by motion capture, and provides a performance and interaction contents with a voice of the specific singer through TTS and voice cloning.

The device described above may be implemented by a hardware component, a software component, and/or a combination of the hardware component and the software component. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner. The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMs, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. An artificial intelligence (AI) avatar-based interaction service method performed in a system including an unmanned information terminal and an interaction service device, the method comprising:
   transmitting a sound signal collected from a microphone array mounted in the unmanned information terminal and an image signal collected from a vision sensor to the interaction service device;
   setting a sensing area based on a received sound signal and image signal by the interaction service device;
   recognizing an active speaker based on a voice signal of a user and an image signal of the user collected in the sensing area, by the interaction service device;
   determining a voice information based on the voice signal in response to recognizing the active speaker;
   determining a non-verbal information based on the image signal in response to recognizing the active speaker;
   generating a response for the recognized active speaker, 3D rendering an artificial intelligence avatar, said artificial intelligence avatar reflecting a desired response, wherein generating the response includes applying a first weight to the voice information and a second weight to the non-verbal information in response to the voice information and the non-verbal information having consistent results, and applying a third weight different than the first weight to the voice information and a fourth weight different than the second weight to the non-verbal information in response to the voice information and the non-verbal information having inconsistent results; and
   using the interaction service device to provide the rendered artificial intelligence avatar to the unmanned information terminal.

2. The artificial intelligence avatar-based interaction service method according to claim 1, further comprising:
   using the interaction service device to estimate a sound source direction based on the received sound signal by sound source direction estimation;
   limiting an input of a sound from a side by sidelobe signal cancellation; and
   limiting image input after an object recognized by applying background separation to the received image signal.

3. The artificial intelligence avatar-based interaction service method according to claim 1, further comprising:
   when recognizing the active speaker, using the interaction service device to determine a number of people from the image signal of the user in the sensing area by facial recognition; and
   in the case of recognizing a plurality of people in the sensing area, selecting a person as a speaker as an active speaker using any one or more of sound source position estimation, voice recognition, and mouth-shape recognition.

4. The artificial intelligence avatar-based interaction service method according to claim 1, further comprising:
   determining the non-verbal information by analyzing information including at least one of the group consisting of a facial expression, a pose, a gesture, or a voice tone of a speaker from the received image or audio signal of the user.

5. The artificial intelligence avatar-based interaction service method according to claim 4, further comprising:
   determining the voice information by any one or more of voice recognition, natural language understanding, or speech-to-text.

6. The artificial intelligence avatar-based interaction service method according to claim 4, further comprising, in the providing of the artificial intelligence avatar to the unmanned information terminal, analyzing information including at least one of the group consisting of a facial expression, a gesture, and a voice tone from the audio or image of the user to recognize an emotional state of the user to change an expression, a gesture, or a voice tone of the AI avatar in response to the recognized emotional state or add an effect.

7. The artificial intelligence avatar-based interaction service method according to claim 1, wherein the third weight is lower than the first weight, and the fourth weight is lower than the second weight.

8. The artificial intelligence avatar-based interaction service method according to claim 1, wherein the voice information and the non-verbal information have consistent results based on the voice information being positive, and the non-verbal information being positive.

9. The artificial intelligence avatar-based interaction service method according to claim 1, wherein the voice information and the non-verbal information have consistent results based on the voice information being negative, and the non-verbal information being negative.

10. The artificial intelligence avatar-based interaction service method according to claim 1, wherein the voice information and the non-verbal information have inconsistent results based on the voice information being positive, and the non-verbal information being negative.

11. An artificial intelligence (AI) avatar-based interaction service apparatus, comprising:
  an unmanned information terminal which includes a microphone array and a vision sensor, configured to:
    collect a sound signal from the microphone array, and collect an image signal from the vision sensor; and
  an interaction service device, configured to:
    receive the sound signal and the image signal,
    set a sensing area based on the sound signal and the image signal,
    recognize an active speaker based on a voice signal of a user and an image signal of the user collected in the sensing area,
    determine a voice information based on the voice signal in response to recognizing the active speaker,
    determine a non-verbal information based on the image signal in response to recognizing the active speaker,
    generate a response for the recognized active speaker, including applying a first weight to the voice information and a second weight to the non-verbal information in response to the voice information and the non-verbal information having consistent results, and applying a third weight different than the first weight to the voice information and a fourth weight different than the second weight to the non-verbal information in response to the voice information and the non-verbal information having inconsistent results,
    3D render the artificial intelligence avatar that reflects the response, and
    provide the rendered artificial intelligence avatar to the unmanned information terminal.

12. The artificial intelligence avatar-based interaction service apparatus according to claim 11, wherein the interaction service device estimates a sound source direction based on the received sound signal by sound source direction estimation, limits an input of a sound from a side by sidelobe signal cancellation, and limits image input after an object recognized by applying a background separation to the received image signal.

13. The artificial intelligence avatar-based interaction service apparatus according to claim 11, wherein the interaction service device checks a number of people from the image signal of the user in the sensing area by face recognition and in the case of recognizing a plurality of people in the sensing area, the interaction service device selects a person as an active speaker using any one or more of sound source position estimation, voice recognition, and mouth-shape recognition.

14. The artificial intelligence avatar-based interaction service apparatus according to claim 11, wherein the interaction service device is configured to determine the non-verbal information based on any one or more of a facial expression, a pose, a gesture, or a voice tone of a speaker from the received image signal of the user.

15. The artificial intelligence avatar-based interaction service apparatus according to claim 14, wherein the interaction service device is configured to determine the voice information based on any one or more of voice recognition, natural language understanding, and speech-to-text.

16. The artificial intelligence avatar-based interaction service apparatus according to claim 14, wherein the interaction service device analyzes a facial expression, a gesture, and a voice tone from the image of the user to recognize an emotional state of the user to change an expression, a gesture, or a voice tone of the AI avatar in response to the recognized emotional state or add an effect.

17. The artificial intelligence avatar-based interaction service apparatus according to claim 11, wherein the third weight is lower than the first weight, and the fourth weight is lower than the second weight.

18. The artificial intelligence avatar-based interaction service apparatus according to claim 11, wherein the voice information and the non-verbal information have consistent results based on the voice information being positive, and the non-verbal information being positive.

19. The artificial intelligence avatar-based interaction service apparatus according to claim 11, wherein the voice information and the non-verbal information have consistent results based on the voice information being negative, and the non-verbal information being negative.

20. The artificial intelligence avatar-based interaction service apparatus according to claim 11, wherein the voice information and the non-verbal information have inconsistent results based on the voice information being positive, and the non-verbal information being negative.

\* \* \* \* \*